United States Patent
Smith et al.

(10) Patent No.: US 7,827,392 B2
(45) Date of Patent: *Nov. 2, 2010

(54) SLIDING-WINDOW, BLOCK-BASED BRANCH TARGET ADDRESS CACHE

(75) Inventors: Rodney Wayne Smith, Raleigh, NC (US); James Norris Dieffenderfer, Apex, NC (US); Thomas Andrew Sartorius, Raleigh, NC (US); Brian Michael Stempel, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/422,186

(22) Filed: Jun. 5, 2006

(65) Prior Publication Data

US 2007/0283134 A1    Dec. 6, 2007

(51) Int. Cl.
*G06F 9/00* (2006.01)
(52) U.S. Cl. .................. 712/239; 712/238
(58) Field of Classification Search .......... 712/238, 712/239
See application file for complete search history.

(56) References Cited

U.S. PATENT DOCUMENTS

| | | | | |
|---|---|---|---|---|
| 5,265,213 A | * | 11/1993 | Weiser et al. | 712/240 |
| 5,414,822 A | * | 5/1995 | Saito et al. | 712/240 |
| 5,530,825 A | | 6/1996 | Black et al. | |
| 5,577,217 A | * | 11/1996 | Hoyt et al. | 712/200 |
| 5,584,001 A | * | 12/1996 | Hoyt et al. | 712/238 |
| 5,606,676 A | * | 2/1997 | Grochowski et al. | 712/239 |
| 5,706,492 A | * | 1/1998 | Hoyt et al. | 712/238 |
| 5,737,590 A | * | 4/1998 | Hara | 712/238 |
| 5,740,415 A | * | 4/1998 | Hara | 712/238 |
| 5,774,710 A | * | 6/1998 | Chung | 712/238 |
| 5,835,754 A | * | 11/1998 | Nakanishi | 712/239 |
| 5,864,697 A | * | 1/1999 | Shiell | 712/240 |

(Continued)

FOREIGN PATENT DOCUMENTS

EP    1624369    2/2006

OTHER PUBLICATIONS

Brad Calder and Dir Grunwald "Next Cache Line and Set Prediction", Published: 1995 ACM.*

(Continued)

*Primary Examiner*—Eddie P Chan
*Assistant Examiner*—Idriss N Alrobaye
(74) *Attorney, Agent, or Firm*—Peter Kamarchik; Nicholas J. Pauley; Sam Talpalatsky

(57) ABSTRACT

A sliding-window, block-based Branch Target Address Cache (BTAC) comprises a plurality of entries, each entry associated with a block of instructions containing at least one branch instruction having been evaluated taken, and having a tag associated with the address of the first instruction in the block. The blocks each correspond to a group of instructions fetched from memory, such as an I-cache. Where a branch instruction is included in two or more fetch groups, it is also included in two or more instruction blocks associated with BTAC entries. The sliding-window, block-based BTAC allows for storing the Branch Target Address (BTA) of two or more taken branch instructions that fall in the same instruction block, without providing for multiple BTA storage space in each BTAC entry, by storing BTAC entries associated with different instruction blocks, each containing at least one of the taken branch instructions.

16 Claims, 2 Drawing Sheets

U.S. PATENT DOCUMENTS

| | | | |
|---|---|---|---|
| 5,867,698 A * | 2/1999 | Cumming et al. | 712/238 |
| 5,918,044 A * | 6/1999 | Levitan et al. | 712/235 |
| 5,935,241 A * | 8/1999 | Shiell et al. | 712/240 |
| 5,948,100 A * | 9/1999 | Hsu et al. | 712/238 |
| 6,108,775 A * | 8/2000 | Shiell et al. | 712/240 |
| 6,263,427 B1 * | 7/2001 | Cummins et al. | 712/236 |
| 6,675,279 B2 * | 1/2004 | Arimilli et al. | 711/204 |
| 6,792,521 B2 * | 9/2004 | Arimilli et al. | 711/203 |
| 7,174,444 B2 * | 2/2007 | Altshuler et al. | 712/239 |
| 7,328,332 B2 * | 2/2008 | Tran | 712/238 |
| 7,707,396 B2 * | 4/2010 | Bradford et al. | 712/238 |
| 2002/0013894 A1 * | 1/2002 | Hoogerbrugge | 712/238 |
| 2002/0138700 A1 * | 9/2002 | Holmberg | 711/137 |
| 2002/0194462 A1 * | 12/2002 | Henry et al. | 712/238 |
| 2003/0074538 A1 * | 4/2003 | Arimilli et al. | 711/203 |
| 2003/0226003 A1 * | 12/2003 | Tago et al. | 712/238 |
| 2004/0186985 A1 * | 9/2004 | Tran et al. | 712/239 |
| 2004/0230780 A1 * | 11/2004 | Prasky et al. | 712/238 |
| 2004/0250054 A1 * | 12/2004 | Stark | 712/239 |
| 2005/0132173 A1 * | 6/2005 | Moyer et al. | 712/238 |
| 2005/0262332 A1 * | 11/2005 | Rappoport et al. | 712/239 |
| 2006/0026469 A1 * | 2/2006 | Yokoi | 714/48 |
| 2006/0242391 A1 * | 10/2006 | Elwood | 712/238 |
| 2008/0040576 A1 * | 2/2008 | Stempel et al. | 712/204 |
| 2009/0222645 A1 * | 9/2009 | Moyer et al. | 712/205 |

OTHER PUBLICATIONS

B. Calder, D. Grunwald, Fast and accurate instruction fetch and branch prediction, Proceedings of the 21ST annual international symposium on Computer architecture, p. 2-11, Apr. 18-21, 1994, Chicago, Illinois, United States.*

W. W. Hwu, T. M. Conte, P. P. Chang, Comparing software and hardware schemes for reducing the cost of branches, Proceedings of the 16th annual international symposium on Computer architecture, p. 224-233, Apr. 1989, Jerusalem, Israel.*

* cited by examiner

SLIDING-WINDOW, BLOCK-BASED BRANCH TARGET ADDRESS CACHE

BACKGROUND

The present invention relates generally to the field of processors and in particular to a block-based branch target address cache having a sliding window organization.

Microprocessors perform computational tasks in a wide variety of applications. Improving processor performance is a sempiternal design goal, to drive product improvement by realizing faster operation and/or increased functionality through enhanced software. In many embedded applications, such as portable electronic devices, conserving power and reducing chip size are also important goals in processor design and implementation.

Most modern processors employ a pipelined architecture, where sequential instructions, each having multiple execution steps, are overlapped in execution. This ability to exploit parallelism among instructions in a sequential instruction stream contributes significantly to improved processor performance. Under ideal conditions and in a processor that completes each pipe stage in one cycle, following the brief initial process of filling the pipeline, an instruction may complete execution every cycle.

Such ideal conditions are never realized in practice, due to a variety of factors including data dependencies among instructions (data hazards), control dependencies such as branches (control hazards), processor resource allocation conflicts (structural hazards), interrupts, cache misses, and the like. A major goal of processor design is to avoid these hazards, and keep the pipeline "full."

All real-world programs include branch instructions, which may comprise unconditional or conditional branch instructions. The actual branching behavior of branch instructions is often not known until the instruction is evaluated deep in the pipeline. This generates a control hazard that stalls the pipeline, as the processor does not know which instructions to fetch following the branch instruction, and will not know until the branch instruction evaluates. Most modern processors employ various forms of branch prediction, whereby the branching behavior of conditional branch instructions and branch target addresses are predicted early in the pipeline, and the processor speculatively fetches and executes instructions, based on the branch prediction, thus keeping the pipeline full. If the prediction is correct, performance is maximized and power consumption minimized. When the branch instruction is actually evaluated, if the branch was mispredicted, the speculatively fetched instructions must be flushed from the pipeline, and new instructions fetched from the correct branch target address. Mispredicted branches adversely impact processor performance and power consumption.

There are two components to a branch prediction: a condition evaluation and a branch target address. The condition evaluation (relevant only to conditional branch instructions, of course) is a binary decision: the branch is either taken, causing execution to jump to a different code sequence, or not taken, in which case the processor executes the next sequential instruction following the conditional branch instruction. The branch target address (BTA) is the address to which control branches for either an unconditional branch instruction or a conditional branch instruction that evaluates as taken. Some common branch instructions include the BTA in the instruction op-code, or include an offset whereby the BTA can be easily calculated. For other branch instructions, the BTA is not calculated until deep in the pipeline, and thus must be predicted.

One known technique of BTA prediction utilizes a Branch Target Address Cache (BTAC). A BTAC as known in the prior art is a fully associative cache, indexed by a branch instruction address (BIA), with each data location (or cache "line") containing a single BTA. When a branch instruction evaluates in the pipeline as taken and its actual BTA is calculated, the BIA and BTA are written to the BTAC (e.g., during a writeback pipeline stage). When fetching new instructions, the BTAC is accessed in parallel with an instruction cache (or I-cache). If the instruction address hits in the BTAC, the processor knows that the instruction is a branch instruction (this is prior to the instruction fetched from the I-cache being decoded) and a predicted BTA is provided, which is the actual BTA of the branch instruction's previous execution. If a branch prediction circuit predicts the branch to be taken, instruction fetching begins at the predicted BTA. If the branch is predicted not taken, instruction fetching continues sequentially.

Note that the term BTAC is also used in the art to denote a cache that associates a saturation counter with a BIA, thus providing only a condition evaluation prediction (i.e., taken or not taken). That is not the meaning of this term as used herein.

High performance processors may fetch more than one instruction at a time from the I-cache. For example, an entire cache line, which may comprise, e.g., four instructions, may be fetched into an instruction fetch buffer, which sequentially feeds them into the pipeline. Patent application Ser. No. 11/089,072, assigned to the assignee of the present application and incorporated herein by reference, discloses a BTAC storing two or more BTAs in each cache line, and indexing a Branch Prediction Offset Table (BPOT) to determine which of the BTAs is taken as the predicted BTA on a BTAC hit. The BPOT avoids the costly hardware structure of a BTAC with multiple read ports, which would be necessary to access the multiple BTAs in parallel.

Patent application Ser. No. 11/382,527, "Block-Based Branch Target Address Cache," assigned to the assignee of the present application and incorporated herein by reference, discloses a block-based BTAC storing a plurality of entries, each entry associated with a block of instructions, where one or more of the instructions in the block is a branch instruction that has been evaluated taken. The BTAC entry includes an indicator of which instruction within the associated block is a taken branch instruction, and the BTA of the taken branch. The BTAC entries are indexed by the address bits common to all instructions in a block (i.e., by truncating the lower-order address bits that select an instruction within the block). Both the block size and the relative block borders are thus fixed.

The block-based BTAC works well where each block includes only one taken branch instruction. When two or more branch instructions within a block evaluate as taken a decision must be made to store one branch instruction's BTA and not another's, leading to a performance and power degradation when the other branch evaluates taken. Multiple BTAs could be stored in each BTAC entry; however this wastes valuable silicon area in the usual case where instruction blocks do not include as many taken branch instructions as BTA storage locations in the BTAC entry.

SUMMARY

According to one or more embodiments disclosed herein, a sliding-window, block-based BTAC comprises a plurality of entries, each entry associated with a block of instructions containing at least one branch instruction that has been evaluated taken, and indexed by the address of the first instruction in the block. The block size is fixed (and corresponds to the size of instruction fetch groups), but block boundaries are not fixed, and instruction blocks may overlap. A branch instruction may thus be included in two or more instruction blocks represented by BTAC entries. In some cases, this allows for the sliding-window, block-based BTAC to store the BTAs of two or more taken branch instructions that fall within a single instruction block by defining new blocks and creating associated BTAC entries, without wasting memory by increasing the BTA storage capacity of every BTAC entry.

One embodiment relates to a method of predicting branch instructions in a processor. An entry, associated with a block of two or more instructions that includes at least one branch instruction having been evaluated taken, is stored in a Branch Target Address Cache (BTAC), the BTAC entry having a tag associated with the address of the first instruction in the block. Upon fetching an instruction, the BTAC is accessed to determine if an instruction in one or more blocks is a conditional branch instruction.

Another embodiment relates to a processor. The processor includes a Branch Target Address Cache (BTAC) storing a plurality of entries, each entry associated with a block of two or more instructions that includes at least one branch instruction having been evaluated taken, and the BTAC entry having a tag associated with the address of the first instruction in the block. The processor also includes an instruction execution pipeline operative to index the BTAC with an instruction address upon fetching a group of instructions.

DETAILED DESCRIPTION

Figure 1:
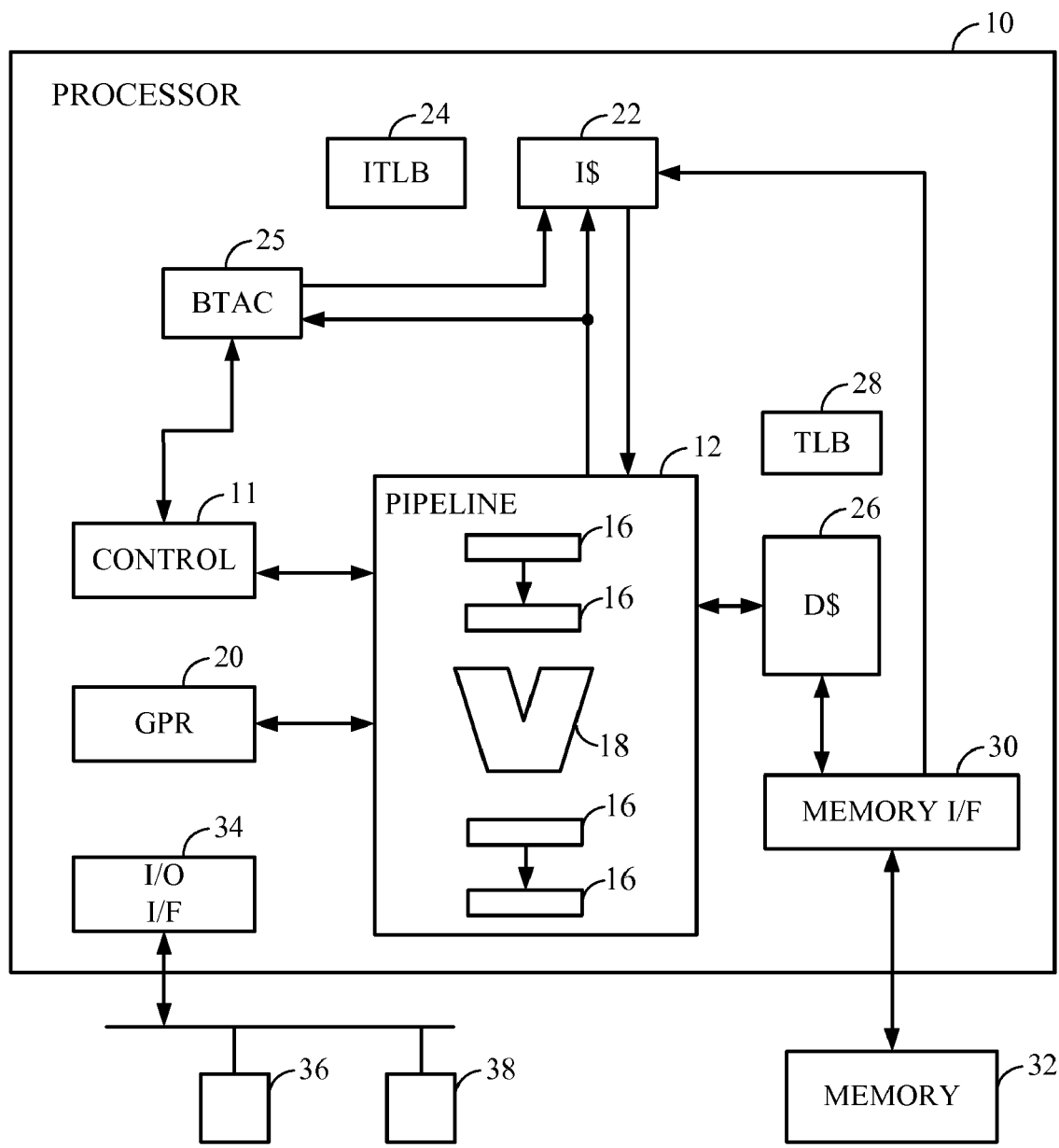
FIG. 1 is a functional block diagram of one embodiment of a processor.

FIG. 1 depicts a functional block diagram of a processor 10. The processor 10 executes instructions in an instruction execution pipeline 12 according to control logic 11. In some embodiments, the pipeline 12 may be a superscalar design, with multiple parallel pipelines. The pipeline 12 includes various registers or latches 16, organized in pipe stages, and one or more Arithmetic Logic Units (ALU) 18. A General Purpose Register (GPR) file 20 provides registers comprising the top of the memory hierarchy.

The pipeline 12 fetches instructions from an instruction cache (I-cache) 22, with memory address translation and permissions managed by an Instruction-side Translation Lookaside Buffer (ITLB) 24. In parallel, the pipeline 12 provides the instruction address to a sliding-window, block-based Branch Target Address Cache (BTAC) 25. If the instruction address hits in the BTAC 25, the sliding-window, block-based BTAC 25 provides a branch target address (BTA) to the I-cache 22, to immediately begin fetching instructions from a predicted BTA. The structure and operation of the sliding-window, block-based BTAC 25 are described more fully below.

Data is accessed from a data cache (D-cache) 26, with memory address translation and permissions managed by a main Translation Lookaside Buffer (TLB) 28. In various embodiments, the ITLB may comprise a copy of part of the TLB. Alternatively, the ITLB and TLB may be integrated.

Similarly, in various embodiments of the processor 10, the I-cache 22 and D-cache 26 may be integrated, or unified. Misses in the I-cache 22 and/or the D-cache 26 cause an access to main (off-chip) memory 32, under the control of a memory interface 30.

The processor 10 may include an Input/Output (I/O) interface 34, controlling access to various peripheral devices 36, 38. Those of skill in the art will recognize that numerous variations of the processor 10 are possible. For example, the processor 10 may include a second-level (L2) cache for either or both the I and D caches 22, 26. In addition, one or more of the functional blocks depicted in the processor 10 may be omitted from a particular embodiment.

Branch instructions are common in most code. By some estimates, as many as one in five instructions may be a branch. Accordingly, early branch detection, branch evaluation prediction (for conditional branch instructions), and fetching instructions from a predicted BTA can be critical to processor performance. Most modern processors include an I-cache 22 that stores a plurality of instructions in each cache line. Instructions are fetched from the I-cache in "fetch groups." A fetch group may comprise a portion of a cache line, an entire cache line, or more than a cache line.

As one example, assume a processor's fetch group matches its I-cache 22 line size of four instructions, although this example is illustrative only and not limiting. To access a commonly known BTAC to search against all four instruction addresses in parallel would require four address compare input ports, four BTA output ports, and a multiplexer and control logic to select a BTA if more than one instruction address hits in the BTAC.

According to one or more embodiments, a sliding-window, block-based BTAC 25 comprises a plurality of entries, each entry storing branch information associated with a taken branch instruction in a block of instructions. The instruction block corresponds to a fetch group, and the BTAC entry includes a tag associated with the address of the first instruction in the block. The tag is also used to fetch the fetch group from the I-cache. In certain embodiments, the tag may be the first instruction in the fetch group. As used herein, the terms "instruction block" and "fetch group" are synonymous. Each BTAC entry indicates the fact that at least one instruction in the block is a branch instruction that has evaluated taken (indicated by a hit in the BTAC 25), and includes an indicator of which instruction in the block is the taken branch, and its BTA.

Figure 2:
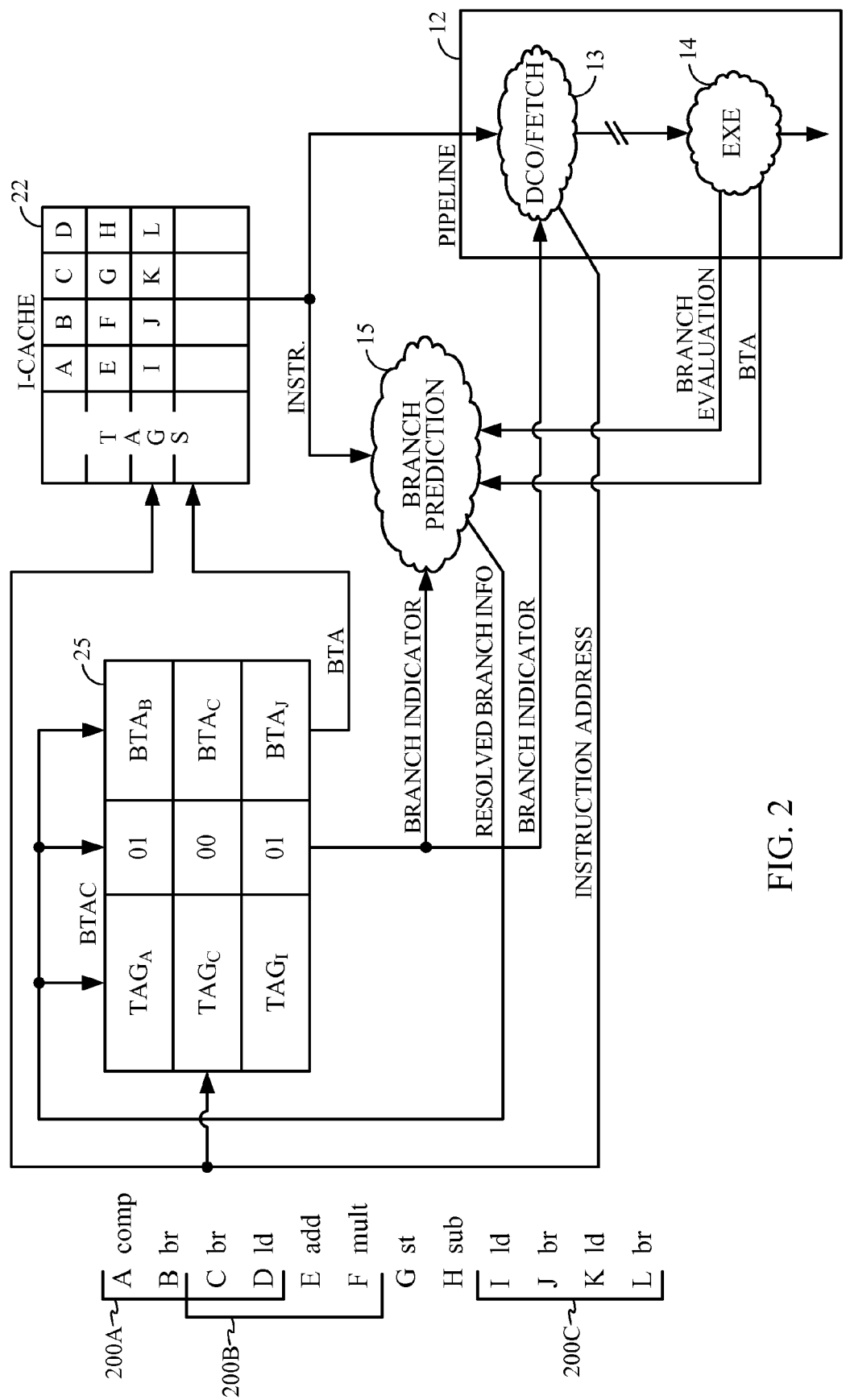
FIG. 2 is a functional block diagram of one embodiment of a Branch Target Address Cache and concomitant circuits.

FIG. 2 depicts a functional block diagram of a sliding-window, block-based BTAC 25, I-cache 22, pipeline 12, and branch prediction logic circuit 15 (which may, for example, comprise part of control logic 11). In this example, instructions A-L reside in three lines in the I-cache 22. For clarity of explanation, the processor fetch group in this example is a cache line, although this is not a limitation of the invention. The instructions and corresponding blocks 200A-200C of a code segment are listed to the left of the circuit diagram. It is noted that although the blocks are labeled in order, no interpretation should be made that the blocks are fetched in the order that they are labeled. More likely, due to the branching nature of the exemplary code segment, the order in which the blocks are fetched would be block 200A, followed by block 200C, and then followed by block 200B.

Each entry in the sliding-window, block-based BTAC 25 of FIG. 2 comprises three components: a tag field comprising the address of the first instruction in the associated instruction block (which is also the instruction used to access the I-cache), a branch indicator depicting which of the instructions within the block is a taken branch, and the actual BTA of the branch instruction when it was last evaluated taken.

In the example of FIG. 2, the first line of the I-cache 22 (or fetch group), comprising instructions A, B, C, and D, is fetched and executed. Of these, instructions B and C are both branch instructions. Instruction B is executed, is evaluated taken, and a branch target address $BTA_B$ is calculated. A BTAC entry is created for the instruction block ABCD. The BTAC entry (the first entry depicted in FIG. 2) has as a tag associated with the address of instruction A, an indicator that the second instruction in the block is the taken branch (address 01), and the $BTA_B$. In another embodiment, the branch indicator may comprise a decoded indication of which instruction is a taken branch, such as 0100.

In this example, instruction B causes a branch to a procedure in another section of code (the specifics of which are not relevant to the present discussion). Upon completing execution, the other code branches back to instruction C, which, when executed, evaluates taken with a target $BTA_C$. In a commonly known block-based BTAC having fixed instruction block boundaries, either $BTA_C$ must replace $BTA_B$ in the BTAC entry, or $BTA_B$ be retained and $BTA_C$ discarded because instruction C would have been fixedly associated with block 200A.

However, utilizing the fluid instruction block boundaries of the sliding-window, block-based BTAC 25, a new instruction block is defined, corresponding to the fetch group fetched from the I-cache upon returning to instruction C from a procedure. The new block comprises instructions C, D, E, and F, and hence partially overlaps the instruction block ABCD. A corresponding BTAC entry is created in the sliding-window, block-based BTAC 25. The tag of the new BTAC entry (the second entry depicted in FIG. 2) is associated with the address of the first instruction in the block (which is also the instruction used to access the I-cache): instruction C. A branch indicator has a value of 00, the address of the first instruction in the block, indicating that instruction C is the taken branch instruction in block CDEF. Finally, the BTAC entry associated with block CDEF includes $BTA_C$, the target address of branch instruction C. In this manner, the sliding-window, block-based BTAC 25 may store BTAs for both of the taken branch instructions in block ABCD, without requiring every BTAC entry to include storage space for two or more BTAs.

Furthermore, the second entry in the sliding-window, block-based BTAC 25 ties the behavior of the branch instruction C to the code path taken prior to its fetch from the I-cache. That is, since the branch instruction C evaluated as taken when the code branched to instruction C while returning from a procedure, the next return from that procedure to instruction C will likely evaluate as taken also. Conversely, when instruction C is executed sequentially (i.e., if the branch instruction B evaluated not taken and the intervening procedure was not executed), it may evaluate not taken.

The third BTAC entry corresponds to a block of instructions comprising I, J, K, and L, corresponding to a fetch group beginning with instruction I. The tag of the third BTAC entry is associated with the address of the first instruction in the block, which is the address with which the I-cache was accessed in fetching the fetch group IJKL. In this group, instructions J and L are branch instructions. In this example, instruction J is evaluated taken, the branch indicator addresses the second instruction in the block, and the $BTA_J$ of instruction J is stored in the BTAC entry.

Of course, the block organization and BTAC entries depicted in FIG. 2 are representative only, and the present invention is not limited to this implementation. In particular, the fetch group need not align with the size of an I-cache line.

In general, a fetch group may begin anywhere within an I-cache line, such as in the case of a branch instruction branching to a target, which may be anywhere in an I-cache line. The tag of the corresponding sliding-window, block-based BTAC 25 entry will be associated with the address of the first instruction in the fetch group. Thus, when the same fetch group is again fetched from the I-cache, a simultaneous access of the sliding-window, block-based BTAC 25 will retrieve the entry indicating a branch instruction within the instruction block which was previously evaluated taken.

Decode/fetch logic 13 in the pipeline 12 is configured to generate an instruction address for fetching the next instruction fetch group from the I-cache 22. In operation, the instruction address simultaneously compares against the tag field of the sliding-window, block-based BTAC 25. If the instruction address matches a tag in the BTAC 25, a hit indication and the corresponding branch indicator are provided to the decode/fetch logic 13 to indicate which instruction in the block is a taken branch instruction. The indicator is also provided to the branch prediction logic 15. Simultaneously, the BTA of the corresponding entry is provided to the I-cache 22, to allow for immediate speculative fetching of instructions from the BTA, to keep the pipeline full in the event the branch is predicted taken.

Instructions are decoded in the decode logic 13. When a branch instruction is detected (whether or not the fetch group address hit in the sliding-window, block-based BTAC 25), fetch group information is retained in the pipeline 12. This information may, for example, comprise a negative offset from the branch instruction address (BIA) to the address of the first instruction in the fetch group. This information is retained against the possibility that the branch instruction is evaluated taken, allowing its BTA to be stored in a new BTAC entry having as a tag the address of the first instruction in the fetch group—i.e., the address with which the I-cache was accessed.

Conditional branch instructions are evaluated in the logic 14 of an execute stage in the pipeline 12. The EXE logic 14 additionally computes and provides the BTA of both unconditional branch instructions and conditional branch instructions that evaluate as taken. If the predicted branch evaluation was incorrect and/or the cached BTA does not match the calculated BTA, the pipeline 12 must perform mispredicted branch recovery, which may include flushing speculative instructions from the pipeline, reallocating storage and computing resources, and the like.

The actual branch evaluation is provided by the EXE logic 14 to the branch prediction logic 15, to update the prediction logic as to the actual branch behavior. The branch prediction logic 15 updates its prediction tables (such as a branch history register, branch prediction table, saturation counters, and the like), and additionally updates the sliding-window, block-based BTAC 25. For existing BTAC entries, this may comprise updating the cached BTA if a different actual BTA was calculated, or may comprise updating both the branch indicator and BTA, if a different branch instruction in the corresponding block evaluates taken and a decision is made to replace the existing cached BTA.

If a branch instruction evaluates taken and the fetch group information indicates a group fetch address unique from any tag in the sliding-window, block-based BTAC 25, the branch prediction logic 15 creates a new BTAC entry. The new BTAC entry corresponds to a block of instructions beginning with the first instruction of the fetch group in which the branch instruction was fetched, and accordingly the tag of the new BTAC entry is associated with the address of the first instruction. In this manner, a branch instruction may be included in two or more instruction blocks having corresponding entries in the sliding-window, block-based BTAC 25. One significant advantage of this feature is that the BTA of a first branch instruction in a first block may be stored in a first BTAC entry, and the BTA of a second branch instruction that is in the first block but is also a part of a second fetch group by virtue of a separate access to the I-cache, may be stored in a second BTAC entry (defining a second instruction block). Accordingly, the sliding-window, block-based BTAC 25 may store both BTAs, without wasting valuable silicon area by providing memory for multiple BTAs in every BTAC entry.

As used herein, in general, a branch instruction may refer to either a conditional or unconditional branch instruction. As used herein, a "taken branch," "taken branch instruction," or "branch instruction having been evaluated taken" refers to either an unconditional branch instruction, or a conditional branch instruction that has been evaluated as diverting sequential instruction execution flow to a non-sequential address (that is, taken as opposed to not taken).

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of predicting branch instructions in a processor, comprising:
   storing in a Branch Target Address Cache (BTAC) a BTAC entry, the BTAC entry associated with a block of two or more instructions stored in one or more lines in an instruction cache (1-cache), only if the block includes at least one branch instruction having been evaluated taken, the BTAC entry having a tag field comprising a full instruction address of a first instruction in the block which begins at any full instruction address within an I-cache line; and
   upon fetching a group of instructions, accessing the BTAC to determine if an instruction in a corresponding block of instructions is a taken branch instruction;
   wherein each BTAC entry includes an indicator of which instruction within the corresponding block is a taken instruction; and
   wherein a first BTAC entry is associated with a first instruction block including first and second taken branch instructions, the first BTAC entry storing a branch target address (BTA) of the first taken branch instruction and a second BTAC entry associated with a second instruction block including the second taken branch instruction stores a BTA of the second taken branch instruction.

2. The method of claim 1 further comprising storing in each BTAC entry a Branch Target Address (BTA) of a taken branch instruction within the corresponding block.

3. The method of claim 2, further comprising, after accessing the BTAC, fetching instructions from the BTA.

4. The method of claim 1 wherein for at least one BTAC entry, the first instruction in the block is a first instruction in an instruction cache line.

5. The method of claim 1 wherein for at least a one BTAC entry, the full instruction address of the first instruction in the block is a branch target address of a branch instruction.

6. The method of claim 1 further comprising:
   determining whether the at least one branch instruction fetched from the block evaluates as taken;
   determining whether the full instruction address of the first instruction in the block is unique from tags in the BTAC; and
   creating the BTAC entry in response to the at least one branch instruction fetched from the block being evaluated as taken and the full instruction address of the first instruction in the block being unique from the tags in the BTAC, the BTAC entry having a tag field comprising the full instruction address of the first instruction, wherein the first instruction is located at any full instruction address within an I-cache line.

7. The method of claim 6 further comprising:
   retaining an offset from a branch instruction address of the at least one branch instruction to the full instruction address of the first instruction; and
   creating the tag field utilizing the offset.

8. The method of claim 1 further comprising:
   determining that a Branch Target address (BTA) associated with the BTAC entry is different from the BTA stored in the existing BTAC entry; and
   updating the existing BTAC entry.

9. A processor, comprising:
   a Branch Target Address Cache (BTAC) storing a first BTAC entry and a second BTAC entry, the first BTAC entry associated with a first block of two or more instructions having first and second taken branch instructions stored in a line in an instruction cache (I-cache), the second BTAC entry associated with a second block of two or more instructions that overlap the first block, the second block including the second taken branch instruction, and each BTAC entry having a tag field comprising a full instruction address of a first instruction in the corresponding block which begins at any full instruction address within an I-cache line; and
   an instruction execution pipeline operative to access the BTAC with an instruction address upon fetching the second block of instructions to identify a branch target address associated with the second taken branch instruction;
   wherein each BTAC entry includes an indicator of which instruction within an associated group of instructions is taken; and wherein each BTAC entry includes a Branch Target Address (BTA) of a taken branch instruction within an associated group of instructions.

10. The processor of claim 9 further comprising:
    branch prediction logic which determines whether the full instruction address of the first instruction in the block is unique from any tag in the BTAC and creates a sliding window BTAC entry having a tag field comprising the full instruction address of the first instruction, wherein the first instruction is located at any full instruction address within an I-cache line.

11. A method of predicting branch instructions contained in an instruction line in an instruction cache (I-cache), comprising:
    storing in a Branch Target Address Cache (BTAC) a first BTAC entry only if a branch instruction evaluates as taken, wherein the branch instruction and a second branch instruction are located in a first instruction block stored in a line in the I-cache; and
    storing in the BTAC a second BTAC entry only if the second branch instruction evaluates as taken, wherein a second instruction block having the second branch instruction is stored in one or more lines in the I-cache overlapping the first instruction block;

wherein the first BTAC entry comprises a first tag field having a full instruction address of a first instruction in the first instruction block and the second BTAC entry comprises a second tag field having a full instruction address of the second instruction block stored at any full instruction address within the I-cache line;

fetching an instruction group from the I-cache beginning at the full instruction address of the second instruction block; and comparing the full instruction address with tag fields of BTAC entries to determine a match with the second tag field; and upon determining a match with the second tag field, using an indicator in the second BTAC entry to determine which instruction in the second block of instruction is the second taken branch instruction; and fetching instructions from the branch target address stored in the second BTAC entry.

12. The method of claim 11 further comprising: upon fetching a block of instructions, accessing the BTAC to determine if an instruction in a corresponding block of instructions is a taken branch instruction.

13. A method of predicting branch instructions in a processor, comprising:

storing in a Branch Target Address Cache (BTAC) a first BTAC entry and a second BTAC entry, the first BTAC entry associated with a first block of two or more instructions having first and second taken branch instructions stored in a line in an instruction cache (I-cache), the second BTAC entry associated with a second block of two or more instructions that overlap the first block and includes the second taken branch instruction, each BTAC entry having a tag field comprising a full instruction address of a first instruction in the corresponding block which begins at any full instruction address within an I-cache line; and upon fetching a group of instructions, accessing the BTAC to determine if an instruction in a corresponding block of instructions is a taken branch instruction; and wherein each BTAC entry includes an indicator of which instruction within an associated group of instructions is taken; and wherein each BTAC entry includes a Branch Target Address (BTA) of a taken branch instruction within an associated group of instructions.

14. The method of claim 13 further comprising:

determining that a Branch Target address (BTA) associated with the second BTAC entry is different from the BTA stored in the existing second BTAC entry; and updating the existing second BTAC entry.

15. The method of claim 13 further comprising:

determining a branch instruction detected in the fetched group of instructions is not a taken branch instruction; and storing a new entry in the BTAC upon determining the branch instruction evaluates as taken, wherein the new entry in the BTAC is based on fetch group information saved when the branch instruction was detected.

16. The method of claim 15, wherein the fetch group information comprises a negative offset from the branch instruction address to the address of the first instruction in the fetched group of instructions.

* * * * *

UNITED STATES PATENT AND TRADEMARK OFFICE
CERTIFICATE OF CORRECTION

| | | |
|---|---|---|
| PATENT NO. | : 7,827,392 B2 | Page 1 of 1 |
| APPLICATION NO. | : 11/422186 | |
| DATED | : November 2, 2010 | |
| INVENTOR(S) | : Smith et al. | |

It is certified that error appears in the above-identified patent and that said Letters Patent is hereby corrected as shown below:

Column 07, line 65, claim 5: "a one" to read as --one--

Column 09, line 16, claim 11: "the second block of instruction" to read as --the second block of instructions--

Signed and Sealed this
Thirtieth Day of August, 2011

David J. Kappos
*Director of the United States Patent and Trademark Office*